US 11,269,981 B2

(12) United States Patent
Hu et al.

(10) Patent No.: US 11,269,981 B2
(45) Date of Patent: Mar. 8, 2022

(54) INFORMATION DISPLAYING METHOD FOR TERMINAL DEVICE AND TERMINAL DEVICE

(71) Applicant: Huawei Technologies Co., Ltd., Shenzhen (CN)

(72) Inventors: Changqi Hu, Shenzhen (CN); Dawei Li, Nanjing (CN); Xingguang Song, Beijing (CN); Jiping Liao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/276,196

(22) Filed: Feb. 14, 2019

(65) Prior Publication Data
US 2019/0197226 A1 Jun. 27, 2019

Related U.S. Application Data

(63) Continuation of application No. PCT/CN2016/108942, filed on Dec. 7, 2016.

(30) Foreign Application Priority Data

Aug. 15, 2016 (CN) .......................... 201610670809.4

(51) Int. Cl.
G06F 21/00 (2013.01)
G06F 21/32 (2013.01)
(Continued)

(52) U.S. Cl.
CPC ................ *G06F 21/32* (2013.01); *G06F 9/44* (2013.01); *G06F 9/542* (2013.01); *G06K 9/00288* (2013.01); *G06F 2221/2149* (2013.01)

(58) Field of Classification Search
CPC .......... G06F 21/32; G06F 21/30; G06F 21/31; G06F 21/316; G06F 21/36; G06F 21/45;
(Continued)

(56) References Cited

U.S. PATENT DOCUMENTS

2012/0084734 A1* 4/2012 Wilairat ................ G06F 21/629
715/863
2014/0106711 A1 4/2014 Seo et al.
(Continued)

FOREIGN PATENT DOCUMENTS

CN 103617385 A 3/2014
CN 104102862 A 10/2014
(Continued)

OTHER PUBLICATIONS

Machine Translation and Abstract of Chinese Publication No. CN103617385, Mar. 5, 2014, 14 pages.
(Continued)

Primary Examiner — Edward Zee
(74) Attorney, Agent, or Firm — Conley Rose, P.C.

(57) ABSTRACT

An information displaying method for a terminal device, and a terminal device, where the method includes displaying, by the terminal device, prompt information on a screen of the terminal device when the terminal device is in a screen-locked state, collecting, by the terminal device, a user face image using a camera of the terminal device, and displaying, by the terminal device on the screen of the terminal device, content information corresponding to the prompt information when the user face image matches an image template stored in the terminal device. According to the information displaying method, related information is displayed through facial recognition without releasing the screen-locked state (Continued)

of a mobile phone such that convenience of information displaying is improved while information security is ensured.

20 Claims, 6 Drawing Sheets

(51) Int. Cl.
*G06F 9/44* (2018.01)
*G06F 9/54* (2006.01)
*G06K 9/00* (2022.01)

(58) Field of Classification Search
CPC .... G06F 21/62; G06F 21/6209; G06F 21/629; G06F 2221/2149; G06F 9/542; G06K 9/00288
See application file for complete search history.

(56) References Cited

U.S. PATENT DOCUMENTS

| | | | |
|---|---|---|---|
| 2014/0273964 A1* | 9/2014 | Noh | H04M 1/72403 455/411 |
| 2014/0283128 A1* | 9/2014 | Shepherd | G06F 21/74 726/28 |
| 2014/0283141 A1 | 9/2014 | Shepherd et al. | |
| 2014/0366158 A1 | 12/2014 | Han et al. | |
| 2015/0074615 A1 | 3/2015 | Han et al. | |
| 2016/0014258 A1 | 1/2016 | Hwang et al. | |
| 2019/0258808 A1 | 8/2019 | Han et al. | |

FOREIGN PATENT DOCUMENTS

| | | |
|---|---|---|
| CN | 104503689 A | 4/2015 |
| CN | 104598792 A | 5/2015 |
| CN | 104615920 A | 5/2015 |
| CN | 104837113 A | 8/2015 |
| CN | 105022945 A | 11/2015 |
| CN | 105117628 A | 12/2015 |
| CN | 105122267 A | 12/2015 |
| CN | 105184134 A | 12/2015 |
| CN | 105278856 A | 1/2016 |
| CN | 105378743 A | 3/2016 |
| CN | 105426745 A | 3/2016 |
| CN | 105553947 A | 5/2016 |
| CN | 105574382 A | 5/2016 |
| CN | 105653226 A | 6/2016 |
| CN | 105740671 A | 7/2016 |
| CN | 105787341 A | 7/2016 |
| CN | 105791599 A | 7/2016 |
| CN | 105809042 A | 7/2016 |
| CN | 105825114 A | 8/2016 |
| EP | 3041206 B1 | 9/2018 |

OTHER PUBLICATIONS

Machine Translation and Abstract of Chinese Publication No. CN104598792, May 6, 2015, 35 pages.
Machine Translation and Abstract of Chinese Publication No. CN105117628, Dec. 2, 2015, 19 pages.
Machine Translation and Abstract of Chinese Publication No. CN105184134, Dec. 23, 2015, 16 pages.
Machine Translation and Abstract of Chinese Publication No. CN105426745, Mar. 23, 2016, 21 pages.
Machine Translation and Abstract of Chinese Publication No. CN105574382, May 11, 2016, 21 pages.
Foreign Communication From A Counterpart Application, Chinese Application No. 201610670809.4, Chinese Search Report dated Dec. 28, 2017, 10 pages.
Foreign Communication From A Counterpart Application, PCT Application No. PCT/CN2016/108942, English Translation of International Search Report dated May 3, 2017, 2 pages.
Foreign Communication From A Counterpart Application, PCT Application No. PCT/CN2016/108942, English Translation of Written Opinion dated May 3, 2017, 4 pages.
Foreign Communication From A Counterpad Application, European Application No. 16913414.5, Extended European Search Report dated Nov. 28, 2019, 9 pages.

* cited by examiner

//  INFORMATION DISPLAYING METHOD FOR TERMINAL DEVICE AND TERMINAL DEVICE

CROSS-REFERENCE TO RELATED APPLICATIONS

This application is a continuation of International Patent Application No. PCT/CN2016/108942 filed on Dec. 7, 2016, which claims priority to Chinese Patent Application No. 201610670809.4 filed on Aug. 15, 2016. The disclosures of the aforementioned applications are hereby incorporated by reference in their entireties.

TECHNICAL FIELD

The present disclosure relates to the field of electronic technologies, and in particular, to an information displaying method for a terminal device, and a terminal device.

BACKGROUND

Terminal devices (for example, smartphones and tablet computers) have become necessities in modern life due to rapid increase of penetration of the terminal devices. In daily life, users can use smartphones to deal with more things, for example, watching videos, watching news, viewing emails, recording itineraries, online shopping, and online payment. It may be learned that there is more private content included in transactions processed by the terminal devices.

Currently, when a terminal device receives information (for example, a short message service (SMS) message, a WECHAT message, an application (also referred to as APP) push, and a calendar reminder) and needs to display the information on the terminal device and if in this case, the terminal device is in a screen-locked state, an existing terminal operating system (for example, an ANDROID system or an IOS system) usually provides two displaying manners for setting by a user.

One displaying manner is that the terminal device directly displays content of the information on a screen of the terminal device. This may result in user information leakage and have potential security risks.

Another displaying manner is that only prompt information is displayed on a screen of the terminal device. If the user wants to view complete content information, the user needs to release the screen-locked state of the terminal device and further taps the prompt information or a related program, and then the content information is displayed. This operation manner is relatively complex, causing relatively poor user experience.

SUMMARY

According to a first aspect, an embodiment of the present disclosure provides an information displaying method for a terminal device. The method includes, when a terminal device is in a screen-locked state and prompt information is displayed on a screen of the terminal device, collecting face image information using a camera of the terminal device, and if the face image information matches face image information pre-stored in the terminal device, displaying, on the screen of the terminal device, content information corresponding to the prompt information.

According to the information displaying method in this embodiment of the present disclosure, related information is displayed through facial recognition without releasing the screen-locked state of a mobile phone such that convenience of information displaying is improved while information security is ensured.

The terminal device described in this embodiment of the present disclosure may include a smartphone, a tablet computer, a personal digital assistant, a wearable intelligent device (for example, a smartwatch), and the like.

The terminal device may enter the screen-locked state by receiving an operation of a user, for example, receive signal input of a particular functional button, or receive signal input of a related operation of the user on a touchscreen. Alternatively, the terminal device may enter the screen-locked state when not receiving related instruction input within a particular time. A length of the time may be autonomously set by the user in a system. When the terminal device in this embodiment of the present disclosure is in the screen-locked state, one possible manner is that the user cannot access a program of the terminal device, and only some basic information, for example, time information, date information, communications network information, and a background picture, is displayed on the screen, another possible manner is that the user may access a preset program when the screen is locked but only can perform some particular functions, for example, functions such as pausing and switching in a music player and performing an emergency call.

The screen-locked state described in this embodiment of the present disclosure is a working state in which an intelligent device runs. In one possible manner, when being in a screen-locked state, a display screen of the intelligent device is in a light-up state and can emit screen light. In a manner, luminance of the display screen of the terminal device is set to 0. In another possible manner, when being in a screen-locked state, a display screen of the intelligent device does not emit screen light. The display screen of the intelligent device may also switch, in the screen-locked state, on or off the screen light of the display screen. For example, the display screen of the terminal device is first in a black-screen state in which the screen light is switched off. In this case, program information is obtained, and the display screen of the terminal device may switch on the screen light and display related prompt information. In a possible manner, the prompt information is generated based on the program information. For example, the terminal device generates the prompt information after receiving an SMS message sent by an operator server. In a possible manner, generation of the prompt information based on the program information may be triggered by an operating system. For example, the operating system triggers a piece of prompt information based on a reminder task.

In a possible manner, that the prompt information is displayed on the screen of the terminal device may be that the screen of the terminal device displays the prompt information in a light-up state (where the screen light is switched on).

In a possible manner, the operation of collecting the face image information using the camera of the terminal device may be performed after the display screen is woken up (where the screen light is switched on). For example, in a case, the prompt information is displayed on the display screen of the terminal device. Because a related instruction is not received within a long time, the display screen enters a black-screen state (where the screen light is switched off). After receiving the related instruction, the terminal device wakes up the display screen, and the prompt information is displayed on the display screen again. In this case, an operation of collecting a face image by the camera is triggered. The related instruction may be a signal received by the touchscreen, may be a signal received by a physical button, or may be a speech signal.

In a possible manner, the operation of collecting the face image information using the camera of the terminal device may be performed after the program information is obtained.

In a possible manner, the operation of collecting the face image information using the camera of the terminal device may be performed after the prompt information is generated.

In one possible manner, the operation of collecting the face image and the operation of displaying the prompt information may be concurrently processed. In another possible manner, the operation of collecting the face image and the operation of displaying the prompt information may be sequentially processed. For example, a facial recognition program may run after the program information is obtained to perform the operation of collecting the face image, and then the prompt information is generated based on the program information and is displayed. Alternatively, the operation of collecting the face image may be performed after the prompt information is displayed. Alternatively, the operation of collecting the face image may be performed after a period of time since the prompt information is received.

The prompt information in this embodiment of the present disclosure may be prompt information generated by the terminal device after receiving the program information. The program information may be application program information (an SMS message, a multimedia message, or information of a program such as a social software program, an email program, a browser program, or a music player program) or system program information (information such as a reminder or a task that is triggered by a system process). The terminal device may receive related information through a wireless network (a Global System for Mobile communications (GSM) network, a Code Division Multiple Access (CDMA) network, a wideband CDMA (WCDMA) network, WI-FI, BLUETOOTH, and the like) or a wired network.

Alternatively, the prompt information in this embodiment of the present disclosure may be prompt information generated by the terminal device based on preset program information. The preset program information may include reminder information that is set on a clock program, a notepad program, or another similar application program on the terminal device, or maybe system program information (information such as a reminder or a task that is triggered by the system process).

A displaying manner of the prompt information in this embodiment of the present disclosure may be displaying an icon on the screen of the terminal device or displaying some text on the screen of the terminal device, may be a combination of an icon and text, or may be another similar manner. In addition, when displaying the prompt information, the terminal device may also make an alert tone.

A manner of determining whether the face image information matches the pre-stored face image information in this embodiment of the present disclosure may be a manner, for example, a feature matching manner, in an existing facial recognition technology, and details are not described herein. A key point of the present disclosure is information displaying using a facial recognition result when the terminal device is still in the screen-locked state, and does not relate to improvement of the facial recognition technology.

The content information corresponding to the prompt information in this embodiment of the present disclosure may include content of the program information or a source of the program information.

In an implementation of the present disclosure, the method further includes obtaining program information, and generating the prompt information based on the program information. The program information includes system program information or application program information.

In an implementation of the present disclosure, the method further includes, if the face image information does not match the face image information pre-stored in the terminal device, displaying, on the screen of the terminal device, updated information corresponding to the prompt information. The updated information is information obtained after keyword deletion is performed on the content information corresponding to the prompt information. In a possible implementation, the user may set some keywords in the terminal device, or may set some preset keyword deletion rules. The terminal device may pre-store a keyword library for the user to choose the keyword. The keyword may be a Chinese character, an English word, a symbol, a digit, or the like.

In an implementation of the present disclosure, the method further includes, if the face image information does not match the face image information pre-stored in the terminal device, displaying, on the screen of the terminal device, updated information corresponding to the prompt information. The updated information is information obtained after keyword replacement is performed on the content information corresponding to the prompt information. In a possible implementation, the user may set some keywords in the terminal device, or may set some preset keyword replacement rules. The terminal device may pre-store a keyword library for the user to choose the keyword. The keyword may be a Chinese character, an English word, a symbol, a digit, or the like.

In an implementation of the present disclosure, the method further includes if the face image information does not match the face image information pre-stored in the terminal device, skipping displaying, on the screen of the terminal device, the content information corresponding to the prompt information. In this case, displaying of the prompt information may be maintained. Alternatively, the prompt information is hidden after being displayed for a period of time, and a home screen of the intelligent device in a screen-locked state is displayed.

In an implementation of the present disclosure, the method further includes obtaining screen unlock information, where the screen unlock information includes one of the following information voice information, fingerprint information, text information, or screen touch information, and if the screen unlock information matches preset screen unlocking information and the face image information does not match the face image information pre-stored in the terminal device, releasing the screen-locked state of the terminal device, and displaying, on the screen of the terminal device, updated information corresponding to the prompt information. The updated information is information obtained after keyword deletion or keyword replacement is performed on the content information corresponding to the prompt information. For the keyword deletion or replacement, refer to the manner in the foregoing embodiment.

In a possible implementation, the operation of collecting the face image and an operation of receiving the screen unlock information may be performed in parallel. In a possible implementation, the operation of collecting the face image may be triggered based on the screen unlock information. For example, the face image starts to be collected after the screen unlock information is received.

According to a second aspect, an embodiment of the present disclosure discloses a terminal device. The terminal includes a display screen, a processor, and a camera.

The camera of the terminal device is configured to collect face image information when the terminal device is in a screen-locked state and prompt information is displayed on the display screen.

The processor is configured to determine whether the face image information matches face image information pre-stored in the terminal device.

The display screen is further configured to, when the face image information matches the face image information pre-stored in the terminal device, display content information corresponding to the prompt information.

According to the terminal device in this embodiment of the present disclosure, related information is displayed through facial recognition without releasing the screen-locked state of a mobile phone such that convenience of information displaying is improved while information security is ensured.

In a possible implementation, the terminal device further includes a receiver. The receiver is configured to obtain program information. The program information includes system program information or application program information. The processor is further configured to generate the prompt information based on the program information. The receiver is usually a functional component receiving information transmitted through a network, for example, a wireless network (a GSM network, a CDMA network, WI-FI, BLUETOOTH, and the like). However, in a possible implementation, for example, when the prompt information is triggered by the terminal device, the receiver may be a function module that is in the processor and that is configured to obtain local program information of the terminal device.

In a possible implementation, the display screen is further configured to, when the face image information does not match the face image information pre-stored in the terminal device, display updated information corresponding to the prompt information. The updated information is information obtained after keyword deletion is performed on the content information corresponding to the prompt information.

In a possible implementation, the display screen is further configured to, when the face image information does not match the face image information pre-stored in the terminal device, display updated information corresponding to the prompt information. The updated information is information obtained after keyword replacement is performed on the content information corresponding to the prompt information.

In a possible implementation, the display screen is further configured to, when the face image information does not match the face image information pre-stored in the terminal device, skip displaying the content information corresponding to the prompt information.

In a possible implementation, the processor is further configured to obtain screen unlock information. The screen unlock information includes one of the following information voice information, fingerprint information, text information, or screen touch information. If the processor determines that the screen unlock information matches preset screen unlocking information and the face image information does not match the face image information pre-stored in the terminal device, the processor is further configured to release the screen-locked state of the terminal device.

The display screen is further configured to display updated information corresponding to the prompt information. The updated information is information obtained after keyword deletion or keyword replacement is performed on the content information corresponding to the prompt information.

It may be understood that for a related operation of the terminal device in this embodiment, refer to the operation in the method embodiment according to the first aspect, and details are not described herein again.

According to a third aspect, an embodiment of the present disclosure discloses a method for releasing a lock state of a terminal device. The method includes obtaining screen unlock information, where the screen unlock information includes one of the following information voice information, fingerprint information, text information, or screen touch information, collecting face image information using a camera of the terminal device, and if the screen unlock information matches preset screen unlocking information and the face image information matches face image information pre-stored in the terminal device, releasing a lock state of the terminal device such that the terminal enters a normal access state, or if the screen unlock information matches preset screen unlocking information and the face image information does not match face image information pre-stored in the terminal device, releasing a lock state of the terminal device such that the terminal device enters a privacy-mode access state, where information that can be accessed by the terminal device in the privacy-mode access state is less than that of information that can be accessed by the terminal device in the normal access state.

According to the method for releasing a lock state of a terminal device in this embodiment of the present disclosure, facial authentication is performed while the screen unlock information is verified such that information privacy is improved, and private information of a user is effectively protected.

The normal access state described in this embodiment of the present disclosure is a normal state of the terminal device during working. In this state, the user possesses relatively high access permission. The privacy-mode access state described in this embodiment of the present disclosure is an access state relative to the normal access state. In this state, some information, for example, some application programs, a contact method for a particular contact, a call record, and a photo, of the terminal device is invisible to the user. In an implementation, the privacy-mode access state also includes deletion and replacement on particular information. In a case of information replacement, it is also considered that a quantity of pieces of accessible information in the privacy-mode access state is less than that of accessible information in the normal access state. The accessible information includes information, for example, an address book, an application program, and an image library, that is stored in the terminal device.

A manner of determining whether the face image information matches the pre-stored face image information in this embodiment of the present disclosure may be a manner, for example, a feature matching manner, in an existing facial recognition technology, and details are not described herein. A key point of the present disclosure is information displaying using a facial recognition result when the terminal device is still in the screen-locked state, and does not relate to improvement of the facial recognition technology.

In a possible implementation, when the terminal device is in the privacy-mode access state, the method further includes obtaining program information, where the program information includes system program information or application program information, and obtaining updated information based on the program information if the program information includes a preset keyword, where the updated information is information obtained after keyword deletion or keyword replacement is performed on the program information.

In a possible implementation, the method further includes generating, by the terminal device, prompt information based on the program information, displaying the prompt information on a screen of the terminal device, obtaining request information for accessing the prompt information, and displaying the updated information based on the request information.

In a possible implementation, the generating, by the terminal device, prompt information includes generating, by the terminal device, the prompt information after obtaining the program information, or generating, by the terminal device, the prompt information after obtaining the updated information.

For concepts of the program information and the prompt information and related operations in this embodiment of the present disclosure, refer to related examples in the embodiment according to the first aspect, and details are not described herein again.

According to a fourth aspect, an embodiment of the present disclosure discloses a terminal device. The terminal device includes a processor and a camera. The processor is configured to obtain screen unlock information. The screen unlock information includes one of the following information voice information, fingerprint information, text information, or screen touch information. The camera is configured to collect face image information. The processor is further configured to determine whether the screen unlock information matches preset screen unlocking information, and determine whether the face image information matches face image information pre-stored in the terminal device. The processor is further configured to release a lock state of the terminal device when the screen unlock information matches the preset screen unlocking information and the face image information matches the face image information pre-stored in the terminal device such that the terminal enters a normal access state. The processor is further configured to release a lock state of the terminal device when the screen unlock information matches the preset screen unlocking information and the face image information does not match the face image information pre-stored in the terminal device such that the terminal enters a privacy-mode access state. Information that can be accessed by the terminal device in the privacy-mode access state is less than that of information that can be accessed by the terminal device in the normal access state.

In a possible implementation, the processor is further configured to obtain program information when the terminal device is in the privacy-mode access state, where the program information includes system program information or application program information, and determine whether the program information includes a preset keyword. If the program information includes the preset keyword, the processor obtains updated information based on the program information. The updated information is information obtained after keyword deletion or keyword replacement is performed on the program information.

In a possible implementation, the terminal device further includes a display screen. The processor is further configured to generate prompt information based on the program information. The display screen is configured to display the prompt information. The processor is further configured to obtain request information for accessing the prompt information. The display screen is further configured to display the updated information based on the request information.

It may be understood that for a related operation of the terminal device in this embodiment, refer to the operation in the method embodiment according to the third aspect, and details are not described herein again.

According to a fifth aspect, an embodiment of the present disclosure provides a method for displaying information on a terminal device, including displaying prompt information on a screen of a terminal device when the terminal device is in a screen-locked state, then collecting a user face image using a camera of the terminal device, and when the user face image matches an image template stored in the terminal device, displaying, on the screen of the terminal device, content information corresponding to the prompt information. It may be learned that according to this solution, information security is protected, and a user can view information content in the screen-locked state, thereby improving convenience of viewing information by the user. When the content information corresponding to the prompt information is displayed on the screen of the terminal device, the terminal device is still in the screen-locked state.

In some feasible implementations, before the displaying prompt information on a screen of a terminal device, the terminal device receives application program information, and generates the prompt information based on the application program information. The application program information includes a preset keyword. It may be learned that the terminal device hides information in a targeted manner. In this way, information security can be protected, and user experience is not affected.

In some optional implementations, when detecting a tap/slide operation of the user on the prompt information, the terminal device collects the user face image using the camera of the terminal device. Alternatively, when receiving voice information for displaying the prompt information, the terminal device collects the user face image using the camera of the terminal device.

In some feasible implementations, the application program information includes one of the following information, social communication information, operator information, and system information.

In some feasible implementations, the method further includes obtaining screen unlock information, where the screen unlock information includes one of the following information voice information, fingerprint information, text information, or screen touch information, releasing the screen-locked state of the terminal device based on the screen unlock information, and when the user face image does not match the stored image target (image template), displaying updated content information on the screen of the terminal device. The updated content information is information obtained after the content information corresponding to the prompt information is processed. It may be learned that although the terminal device enters a system after releasing the screen-locked state, when facial recognition does not succeed, the user cannot view the complete content information corresponding to the prompt information, thereby further protecting the information security.

In some feasible implementations, the voice information includes at least one of a sound frequency, a sound amplitude, and a voiceprint. The fingerprint information includes at least one of a fingerprint image and a fingerprint feature. The text information includes at least one of a data password and a pattern password. The screen touch information includes at least one of a sliding track, a sliding direction, a pressing time length, and pressing intensity.

In some feasible implementations, the updated content information is information obtained after keyword deletion is performed on the content information corresponding to the prompt information or information obtained after keyword replacement is performed on the content information corresponding to the prompt information.

In some feasible implementations, performing keyword replacement includes replacing a keyword with a preset symbol or replacing a keyword with preset text.

In some feasible implementations, before the displaying, on the screen of the terminal device, content information corresponding to the prompt information, the terminal device detects whether the content information corresponding to the prompt information includes a target keyword. If the content information corresponding to the prompt information includes the target keyword, the terminal device prompts the user to enter identity authentication information. The terminal device receives the identity authentication information entered by the user, and when the identity authentication information entered by the user matches stored identity authentication information, displays, on the screen of the terminal device, the content information corresponding to the prompt information. It may be learned that for important information, secondary authentication needs to be performed to display the complete content information corresponding to the prompt information. In this way, information security can be further protected.

In some feasible implementations, if the identity authentication information entered by the user does not match the stored identity authentication information, the updated content information is displayed on the screen of the terminal device. The updated content information is information obtained after the content information corresponding to the prompt information is processed.

In some feasible implementations, the updated content information is information obtained after target keyword deletion is performed on the content information corresponding to the prompt information or is information obtained after target keyword replacement is performed on the content information corresponding to the prompt information.

In some feasible implementations, the foregoing identity authentication information may be different from the screen unlock information. In this way, another user that is not the user of the terminal device but has registered and can release the screen-locked state can be prevented from viewing relatively private information of the user of the terminal device such that the information security can be further protected.

According to a sixth aspect, an embodiment of the present disclosure provides a method for displaying information on a terminal device, including, when a terminal device is in a screen-locked state, receiving screen unlock information, and collecting a user face image using a camera of the terminal device, releasing the screen-locked state of the terminal device based on the screen unlock information, and if the user face image matches an image template stored in the terminal device, entering a first mode, or if the user face image does not match an image template stored in the terminal device, entering a second mode. Information displayed in the second mode is less than that of information displayed in the first mode. It may be learned that privacy and high-risk information of a user are hidden in advance in a background through facial encryption such that when intruding a system, an intruder can see some non-private information of the user. In this way, security of the private information of the user is protected by deceiving the intruder.

In some feasible implementations, the screen unlock information includes one of the following information, voice information, fingerprint information, text information, or screen touch information.

In some feasible implementations, a process of facial image matching and a process of releasing the screen-locked state of the terminal device are performed in parallel. Alternatively, a process of facial image matching and a process of releasing the screen-locked state of the terminal device are sequentially performed.

According to a seventh aspect, the present disclosure provides a terminal device. The terminal device includes a processor. The processor is configured to support the terminal device in performing a corresponding function in the method for displaying information on a terminal device according to the first aspect. The terminal device may further include a memory. The memory is configured to be coupled to the processor and stores a program instruction and data that are necessary to the terminal device. The terminal device may further include a communications interface, used for communication between the terminal device and another device or a communications network. The terminal device further includes a receiver configured to receive information sent by another device or receive information entered by a user.

According to an eighth aspect, the present disclosure provides a terminal device. The terminal device includes a processor. The processor is configured to support the terminal device in performing a corresponding function in the method for displaying information on a terminal device according to the second aspect. The terminal device may further include a memory. The memory is configured to be coupled to the processor and stores a program instruction and data that are necessary to the terminal device. The terminal device may further include a communications interface, used for communication between the terminal device and another device or a communications network. The terminal device further includes a receiver configured to receive information sent by another device or receive information entered by a user.

According to a ninth aspect, an embodiment of the present disclosure provides a computer storage medium configured to store a computer software instruction used by the terminal device according to the second, fourth, seventh, or eighth aspect. The computer software instruction includes a program designed to execute the foregoing aspect.

According to a tenth aspect, an embodiment of the present disclosure discloses an information displaying method for a terminal device. The method includes, when a terminal device is in a screen-locked state and content information is displayed on a screen of the terminal device, collecting face image information using a camera of the terminal device, and if the face image information does not match face image information pre-stored in the terminal device, hiding the content information on the screen of the terminal device.

According to an eleventh aspect, an embodiment of the present disclosure discloses a terminal device. The terminal device includes a display screen, a processor, and a camera. The camera of the terminal device is configured to collect face image information when the terminal device is in a screen-locked state and content information is displayed on the display screen. The processor is configured to determine whether the face image information matches face image information pre-stored in the terminal device. The display screen is further configured to hide the content information when the face image information does not match the face image information pre-stored in the terminal device.

These aspects or other aspects in the present disclosure are more concise and easily understandable in descriptions in the following embodiments.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and persons of ordinary skill in the art may derive other drawings from these accompanying drawings without creative efforts.

DESCRIPTION OF EMBODIMENTS

Figure 1:
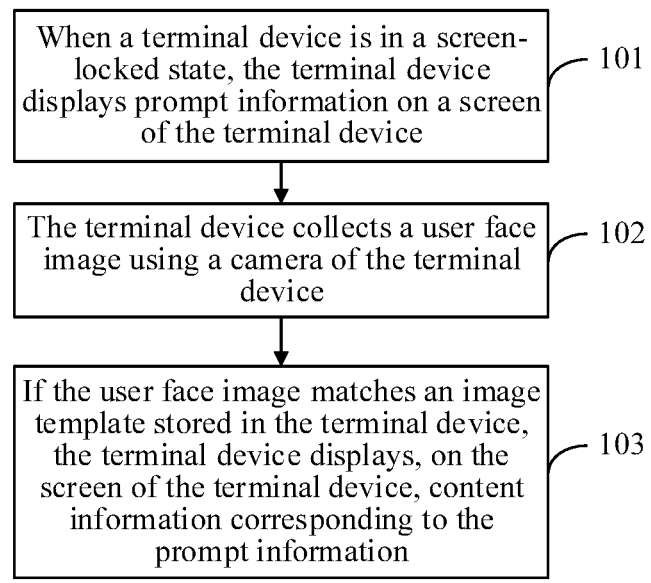
FIG. 1 is a schematic flowchart of a method for displaying information on a terminal device according to an embodiment of the present disclosure.

To make persons skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Detailed descriptions are separately provided below.

In the specification, claims, and accompanying drawings of the present disclosure, the terms "first," "second," "third," "fourth," and so on are intended to distinguish between different objects but do not indicate a particular order. In addition, the terms "including," "including," or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" being mentioned in this specification means that a particular feature, structure, or characteristic described with reference to the embodiment may be included in at least one embodiment of the present disclosure. The term appearing at each place in this specification may not refer to a same embodiment or an independent or a candidate embodiment that is mutually exclusive of another embodiment. Persons skilled in the art explicitly or implicitly understand that the embodiment described in this specification may be combined with another embodiment.

Some terms in this application are explained and described below for the convenience of understanding by persons skilled in the art.

(1) A terminal device/(User Equipment (UE)) is a device providing voice and/or data connectivity for a user. For example, the terminal device is a handheld device or an in-vehicle device that has a wireless connection function. A common terminal includes, for example, a mobile phone, a tablet computer, a notebook computer, a palmtop computer, a mobile Internet device (MID), and a wearable device such as a smartwatch, a smart band, or a pedometer.

(2) A screen of the terminal device is a display screen of the terminal device, and is configured to display information entered by the user or information provided for the user.

(3) "match" means that some features or all features of compared objects are the same. For example, if some features of a user face image are the same as some features of a stored image template or all features of a user face image are the same as all features of a stored image template, it indicates that the user face image matches the stored image template, or if some features of a user face image are not the same as some features of a stored image template or not all features of a user face image are the same as all features of a stored image template, it indicates that the user face image does not match the stored image template.

(4) A screen-locked state is a state in which the terminal device intends to protect data security of a terminal device system and therefore needs to be released by entering a password or using another unlocking manner that is set by the user, and then the terminal device system can be entered.

(5) A camera of the terminal device may be a front-facing camera of the terminal device or may be a rear-facing camera of the terminal device, and is a front-facing camera of the terminal device.

(6) Performing sequentially means that there is a precedence relationship of performing an action A and an action B. For example, the action A is first performed and then the action B is performed. Alternatively, the action B is first performed and then the action A is performed.

(7) Performing concurrently means that an action A and an action B are separately performed on two threads. For example, the action A is performed on a first thread, and the action B is performed on a second thread. The two actions may be simultaneously performed. Alternatively, one action may be performed in a process of performing another action.

(8) "A plurality of" refers to two or more. The term "and/or" describes an association relationship for describing associated objects and indicates that three relationships may exist. For example, A and/or B may represent the following three cases, only A exists, both A and B exist, and only B exists. The character "/" usually indicates an "or" relationship between the associated objects.

The embodiments of this application are described below with reference to the accompanying drawings.

Referring to FIG. 1, FIG. 1 is a schematic flowchart of a method for displaying information on a terminal device according to an embodiment of the present disclosure. The method includes the following steps.

Step 101: When a terminal device is in a screen-locked state, the terminal device displays prompt information on a screen of the terminal device.

In this embodiment of the present disclosure, the screen-locked state indicates a screen-locked state in a general meaning. In this case, an operation interface of the terminal device cannot be accessed. In an embodiment of the present disclosure, prompt information or notification information may be displayed in the screen-locked state. Alternatively, operations, for example, call answering or music playing, of some application programs may be performed in the screen-locked state based on different terminal settings.

In an embodiment of the present disclosure, the notification information is information whose content includes no preset keyword. In this case, the content of the notification information can be directly displayed on the screen of the terminal device.

Step 102: The terminal device collects a user face image using a camera of the terminal device.

Step 103: If the user face image matches an image template stored in the terminal device, the terminal device displays, on the screen of the terminal device, content information corresponding to the prompt information.

The prompt information is used to inform a user that there is unread information. In an implementation, the prompt information is presented in a form of a dialog box.

In an implementation, when displaying, on the screen of the terminal device, the content information corresponding to the prompt information, the terminal device is still in the screen-locked state.

Optionally, the terminal device performs the foregoing step 102 only when detecting a tap or slide operation of the user for the prompt information. Alternatively, the terminal device performs the foregoing step 102 only when receiving voice information that is entered by the user using a microphone of the terminal device and that is for displaying the prompt information. Alternatively, the terminal device performs the foregoing step 102 simultaneously when displaying the prompt information on the screen of the terminal device.

Optionally, if the user face image does not match the stored image template, the terminal device determines whether a fixed value preset in a system expires, and if the fixed value expires, the operation ends, or if the fixed value does not expire, the terminal device continues collecting a user face image for matching, and the operation does not end until the fixed value expires (where for example, the fixed value may be one minute, two minutes, four minutes, five minutes, or another value). Further, in a process in which the terminal device determines whether the fixed value expires, the terminal device may prompt, through voice prompting or text prompting, the user to point the camera of the terminal device at a user face, to obtain a relatively complete user face image.

In this embodiment of the present disclosure, the terminal device is in the screen-locked state. The terminal device displays only the prompt information, then collects the user face image using the camera, and when the user face image matches the image template stored in the terminal device, displays, on the screen of the terminal device, the content information corresponding to the prompt information. In this way, information security is ensured, and the user can view information content in the screen-locked state, thereby improving convenience of viewing information by the user.

Optionally, before the foregoing step 101, the method further includes receiving, by the terminal device, application program information, and generating the prompt information based on the application program information, where the application program information includes a preset keyword.

The preset keyword may be, for example, amount, balance, money, transaction, identification card number, bank card number, ALIPAY, verification code, check digit, mobile number, phone number, order number, voucher, email address, itinerary, arrangement, plan, activity location, activity time, flight, departure time, arrival time, and hotel reservation.

Optionally, the application program information includes one of the following information, social communication information, operator information, and system information.

The social communication information may be, for example, chat information (for example, WeChat and microblog messages), an email, and payment information. The operator information may be, for example, an SMS message. The system information may be, for example, system update information.

Optionally, the method further includes receiving, by the terminal device, screen unlock information, where the screen unlock information includes one of the following information voice information, fingerprint information, text information, or screen touch information, releasing, by the terminal device, the screen-locked state of the terminal device based on the screen unlock information, and if the user face image does not match the stored image target, displaying updated content information on the screen of the terminal device, where the updated content information is information obtained after the content information of the prompt information is processed.

The voice information is collected by the terminal device using the microphone of the terminal device. The voice information includes a sound frequency, a sound amplitude, and a voiceprint.

The fingerprint information is collected by the terminal device when the user presses a fingerprint recognition module. The fingerprint information includes a fingerprint image and a fingerprint feature.

The text information is entered by the user using a touchscreen of the terminal device. The text information includes a data password and a pattern password.

The screen touch information is touch information collected by the terminal device when the user touches the touchscreen of the terminal device. The screen touch information includes at least one of a sliding track, a sliding direction, a pressing time length, and pressing intensity.

Optionally, the updated content information is information obtained after keyword deletion is performed on the content information corresponding to the prompt information or is information obtained after keyword replacement is performed on the content information corresponding to the prompt information.

Performing keyword replacement may be replacing a keyword with a preset symbol or replacing a keyword with preset text. The preset character may be, for example, xxx, !!!, @@@, ***, aaa, or another character. The preset text may be, for example, et cetera et cetera, of of, dot dot, or other text.

The foregoing keyword may be customized by the user, or may be predefined by the terminal device. The keyword may be, for example, amount, balance, money, transaction, identification card number, bank card number, ALIPAY, verification code, check digit, mobile number, phone number, order number, voucher, email address, itinerary, arrangement, plan, activity location, activity time, flight, departure time, arrival time, and hotel reservation.

For example, assuming that the content information corresponding to the prompt information is "Your Alipay is performing a transaction of RMB 1000, and a verification code is 110002," the updated content information may be "Your is performing of RMB 1000, and is 110002," or may be "Your xxx is performing xxx of RMB 1000, and xxx is 110002."

Optionally, after the foregoing step 102, the terminal device may process the user face image using a face feature extraction algorithm to extract multidimensional feature information that can describe the face, and then terminal device matches the multidimensional feature information with the stored image template. If a matching ratio of the multidimensional feature information to the stored image template exceeds a matching threshold, it indicates that the user face image matches the stored image template. If a matching ratio of the multidimensional feature information to the stored image template does not exceed a matching threshold, it indicates that the user face image does not match the stored image template. The matching threshold may be, for example, equal to 80%, 60%, 70%, 75%, or may be another value.

Optionally, before performing a face image matching process, the terminal device may first determine whether the content information corresponding to the prompt information includes a keyword. If the content information corresponding to the prompt information includes the keyword, the terminal device increases the matching threshold value. If the content information corresponding to the prompt information does not include the keyword, only normal matching processing is performed. In this way, user privacy can be further protected. For example, the content information corresponding to the prompt information is "Your Alipay is performing a transaction of RMB 1000, and a check digit is 110002." Because the keyword transaction is included, in this case, the matching threshold value may be increased. The foregoing keyword may be, for example, amount, balance, money, transaction, identification card number, bank card number, verification code, check digit, mobile number, order number, and voucher.

Optionally, security of face unlocking is lower than that of fingerprint unlocking, pattern unlock, digital password unlock, and the like. Therefore, assuming that the content information corresponding to the prompt information is information such as money, identification number, and verification code that has a relatively high security requirement, before the foregoing step 103, the terminal device may detect whether the content information corresponding to the prompt information includes a target keyword. If the content information corresponding to the prompt information includes the target keyword, the terminal device prompts the user to enter identity authentication information, and the terminal device receives the identity authentication information entered by the user. When the identity authentication information entered by the user matches stored identity authentication information, the terminal device performs the foregoing step 103. In this way, information security can be further protected.

The target keyword may be, for example, amount, balance, money, transaction, identification card number, bank card number, verification code, check digit, mobile number, order number, and voucher.

The identity authentication information is not a face image, and may be, for example, a user fingerprint, a pattern, a digital password, and an iris.

The foregoing manner of prompting the user to enter the identity authentication information may be a language prompt, a text prompt, a manner of popping up a dialog box for entering the identity authentication information, and the like.

The foregoing identity authentication information may be the same as the screen unlock information, or may be different from the screen unlock information. This is not limited in the present disclosure.

Further, if the identity authentication information entered by the user does not match the stored identity authentication information, the updated content information is displayed on the screen of the terminal device. The updated content information is information obtained after the content information corresponding to the prompt information is processed.

The updated content information is information obtained after target keyword deletion is performed on the content information corresponding to the prompt information or is information obtained after target keyword replacement is performed on the content information corresponding to the prompt information.

It should be noted that when the identity authentication information entered by the user does not match the stored identity authentication information, and when the updated content information is displayed on the screen of the terminal device, the terminal device is still in the screen-locked state.

For example, assuming that the content information corresponding to the prompt information is "Your Alipay is performing a transaction of RMB 1000, and a check digit is 110002", the updated content information may be "Your is performing of RMB 1000, and is 110002", or may be "Your xxx is performing xxx of RMB 1000, and xxx is 110002".

Figure 2:
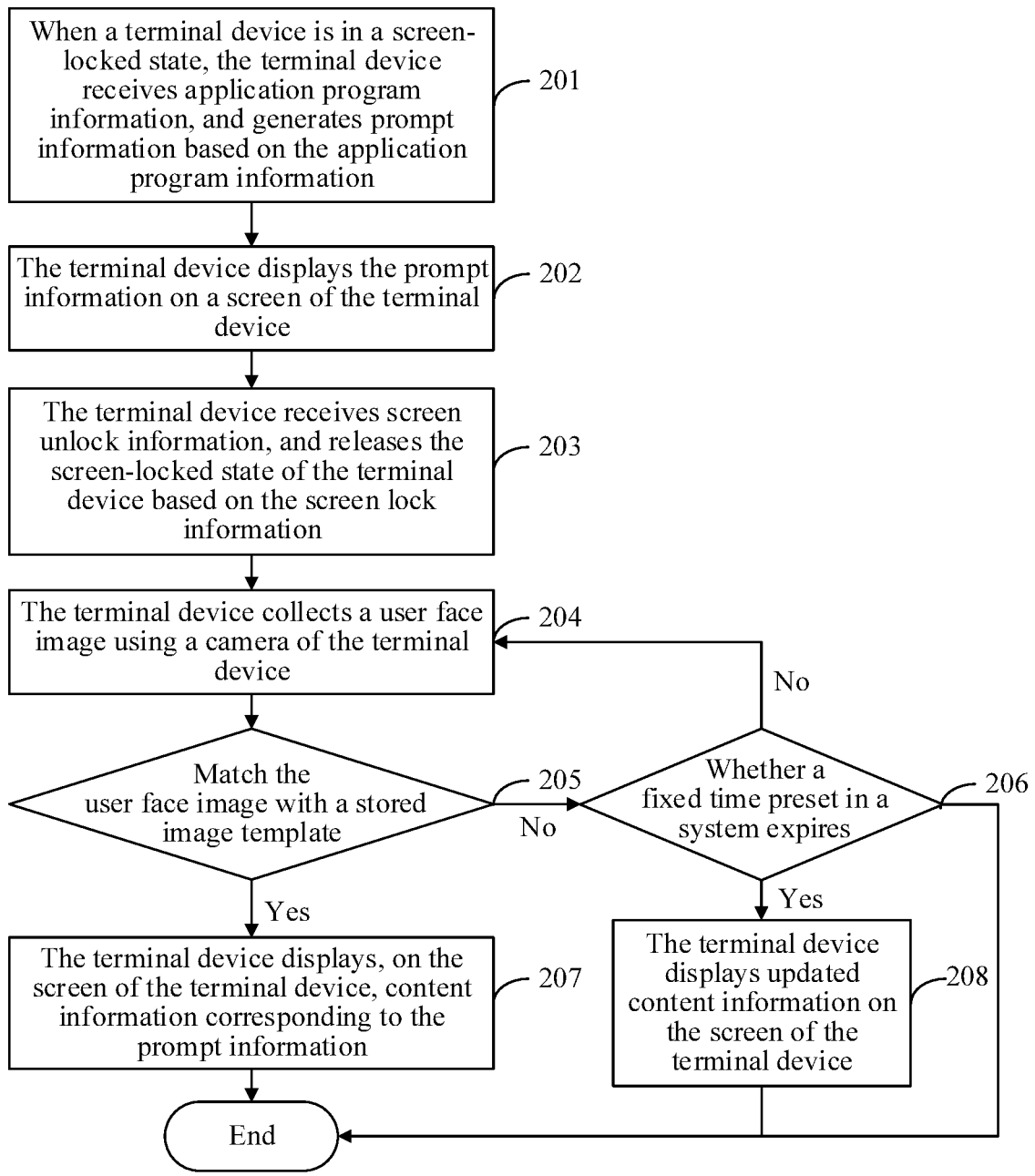
FIG. 2 is a schematic flowchart of another method for displaying information on a terminal device according to an embodiment of the present disclosure.

Referring to FIG. 2, an embodiment of the present disclosure further provides another more detailed method procedure, including the following steps.

Step 201: When a terminal device is in a screen-locked state, the terminal device receives application program information, and generates prompt information based on the application program information, where the application program information includes a preset keyword.

Step 202: The terminal device displays the prompt information on a screen of the terminal device.

Step 203: The terminal device receives screen unlock information, and releases the screen-locked state of the terminal device based on the screen unlock information, where the screen unlock information includes one of the following information, voice information, fingerprint information, text information, or screen touch information.

Step 204: The terminal device collects a user face image using a camera of the terminal device.

Step 205: The terminal device matches the user face image with an image template pre-stored in the terminal device.

If the user face image matches the image template pre-stored in the terminal device, step 207 is performed.

If the user face image does not match the image template pre-stored in the terminal device, step 206 is performed.

Step 206: The terminal device detects whether a fixed time preset in a system expires.

If the fixed time already expires, step 208 is performed.

If the fixed time does not expire, step 204 is performed.

Step 207: The terminal device displays, on the screen of the terminal device, content information corresponding to the prompt information.

Step 208: The terminal device displays updated content information on the screen of the terminal device, where the updated content information is information obtained after the content information corresponding to the prompt information is processed.

It should be noted that the foregoing step 203 is sequentially performed with the foregoing step 204, and is performed before the foregoing step 204. Certainly, the foregoing step 203 may alternatively be performed in parallel with the foregoing step 204. In addition, when displaying, on the screen of the terminal device, the content information corresponding to the prompt information and when displaying the updated content information on the screen of the terminal device, the terminal device already releases the screen-locked state. For a specific implementation process of each step of the method shown in FIG. 2, refer to the specific implementation process described in the foregoing method, and details are not described herein again.

Figure 3:
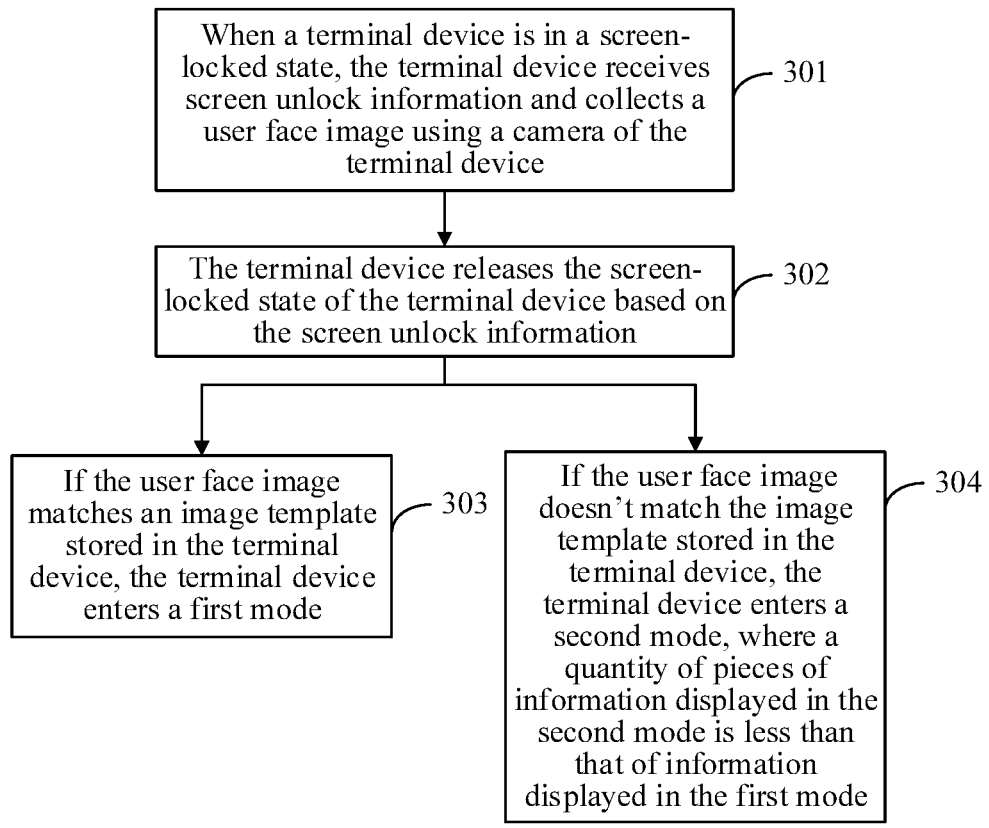
FIG. 3 is a schematic flowchart of another method for displaying information on a terminal device according to an embodiment of the present disclosure.

Referring to FIG. 3, FIG. 3 is a schematic flowchart of a method for displaying private information according to an embodiment of the present disclosure. The method includes the following steps.

Step 301: When a terminal device is in a screen-locked state, the terminal device receives screen unlock information and collects a user face image using a camera of the terminal device.

Step 302: The terminal device releases the screen-locked state of the terminal device based on the screen unlock information.

Step 303: If the user face image matches an image template stored in the terminal device, the terminal device enters a first mode.

Step 304: If the user face image does not match the image template stored in the terminal device, the terminal device enters a second mode, where information displayed in the second mode is less than that of information displayed in the first mode.

The first mode and the second mode are both contextual modes. A contextual mode is a running manner of setting, in different environments and cases, a function of the terminal device to be in different statuses, to satisfy a use requirement of a user.

The terminal device may display all information, for example, note information (for example, itinerary information, a diary, and a reminder item), communication-related information (for example, an address book, a call record, a social software chat record, a browser historical record, and an email), an application icon (for example, a QQ icon, a WECHAT icon, a microblog icon, an ALIPAY icon, a TAOBAO icon, and a mailbox icon), and media data information (for example, a picture and a video), of a system in the first mode.

To protect information security, the terminal device may display some information, for example, a calendar, weather, a map, a clock, a setting, or a camera, of the system in the second mode, and private information of the user is not related.

Voice information is collected by the terminal device using a microphone of the terminal device. The voice information includes a sound frequency, a sound amplitude, and a voiceprint.

Fingerprint information is collected by the terminal device when the user presses a fingerprint recognition module. The fingerprint information includes a fingerprint image and a fingerprint feature.

Text information is entered by the user using a touchscreen of the terminal device. The text information includes a data password, a pattern password, and a track password.

Screen touch information is information, for example, a sliding track slid by the user on the touchscreen or a pressing parameter (for example, pressing intensity or a pressing time length) of pressing the touchscreen by the user, of the terminal device when the user touches the touchscreen of the terminal device.

Optionally, a process of facial image matching and a process of releasing the screen-locked state of the terminal device are performed in parallel. Alternatively, a process of facial image matching and a process of releasing the screen-locked state of the terminal device are sequentially performed.

Usually, the terminal device displays all information after releasing the screen-locked state. Consequently, an intruder may successfully intrude a terminal device system after obtaining the screen unlock information (for example, snooping an unlock pattern or a digital password of the user or obtaining a user fingerprint), resulting in a problem of privacy leakage of the user. A facial recognition technology is added to this solution. After the screen-locked state is released, all information is presented only when facial recognition succeeds. If facial recognition does not succeed, only some information is presented. It may be learned that privacy and high-risk information of the user are hidden in advance in a background through facial encryption such that when intruding the system, the intruder can see some non-private information of the user. In this way, security of the private information of the user is protected by deceiving the intruder.

Figure 4:
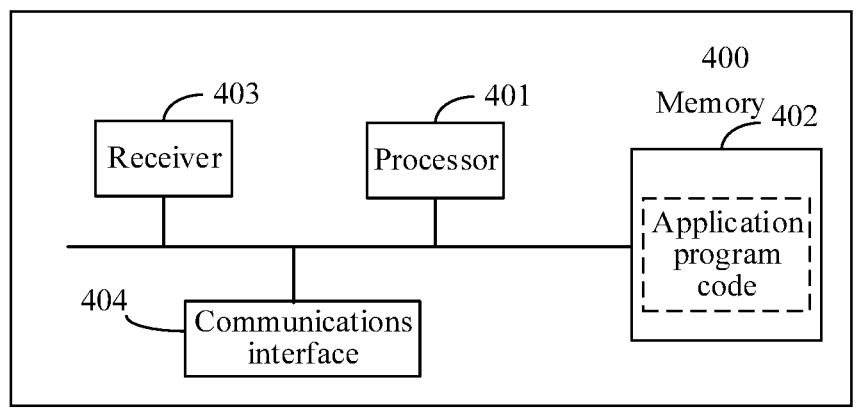
FIG. 4 is a schematic structural diagram of a terminal device according to an embodiment of the present disclosure.

As shown in FIG. 4, a terminal device 400 may be implemented using a structure in FIG. 4. The terminal device 400 includes at least one processor 401, at least one memory 402, at least one receiver 403, and at least one communications interface 404. The processor 401, the memory 402, the receiver 403, and the communications interface 404 connect and complete communication with each other using a communications bus.

The processor 401 may be a general purpose central processing unit (CPU), a microprocessor, an application-specific integrated circuit (ASIC), or one or more integrated circuits configured to control program execution in the foregoing solution.

The receiver 403 is configured to receive information sent by another device or receive information entered by a user.

The communications interface 404 is configured to communicate with another device or a communications network such as the Ethernet, a radio access network (RAN), or a wireless local area network (WLAN).

The memory 402 may be a read-only memory (ROM) or another type of static storage device that can store static information and a static instruction, or a random access memory (RAM) or another type of dynamic storage device that can store information and an instruction, or may be an electrically erasable programmable ROM (EEPROM), a compact disc ROM (CD-ROM) or another compact disc storage medium, optical disc storage medium (including a compact disc, a laser disc, an optical disc, a digital versatile disc (DVD), a BLU-RAY DISC, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor using the bus. Alternatively, the memory may be integrated with the processor.

The memory 402 is configured to store application program code for executing the foregoing solution, and the execution is controlled by the processor 401. The processor 401 is configured to execute the application program code stored in the memory 402.

The code stored in the memory 403 may be used to perform the foregoing method for displaying information on a terminal device that is performed by a terminal device and that is shown in FIG. 1 and FIG. 2. For example, the terminal device is in a screen-locked state, and prompt information is displayed on a screen of the terminal device. A user face image is collected using a camera of the terminal device. If the user face image matches an image template stored in the terminal device, content information corresponding to the prompt information is displayed on the screen of the terminal device.

Figure 5:
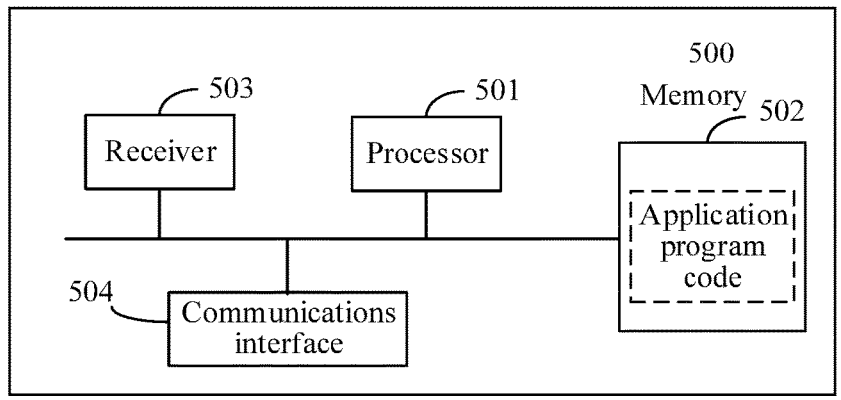
FIG. 5 is a schematic structural diagram of another terminal device according to an embodiment of the present disclosure.

As shown in FIG. 5, a terminal device 500 may be implemented using a structure in FIG. 5. The terminal device 500 includes at least one processor 501, at least one memory 502, at least one receiver 503, and at least one communications interface 504. The processor 501, the memory 502, the receiver 503, and the communications interface 504 are connected and complete communication with each other using a communications bus.

The processor 501 may be a general purpose CPU, a microprocessor, an ASIC, or one or more integrated circuits configured to control program execution in the foregoing solution.

The receiver 503 is configured to receive information sent by another device or receive information entered by a user.

The communications interface 504 is configured to communicate with another device or a communications network such as the Ethernet, a RAN, or a WLAN.

The memory 502 may be a ROM or another type of static storage device that can store static information and a static instruction, or a RAM or another type of dynamic storage device that can store information and an instruction, or may be an EEPROM, a CD-ROM or another compact disc storage medium, optical disc storage medium (including a compact disc, a laser disc, an optical disc, a DVD, a BLU-RAY DISC, or the like) and magnetic disk storage medium, another magnetic storage device, or any other medium that can be configured to carry or store expected program code in a form of an instruction or a data structure and that is accessible to a computer, but is not limited thereto. The memory may independently exist and be connected to the processor using the bus. Alternatively, the memory may be integrated with the processor.

The memory 502 is configured to store application program code for executing the foregoing solution, and the execution is controlled by the processor 501. The processor 501 is configured to execute the application program code stored in the memory 502.

The code stored in the memory 502 may be used to perform the foregoing method for displaying information on a terminal device that is performed by a terminal device and that is shown in FIG. 3. For example, when the terminal device is in a screen-locked state, the terminal device receives screen unlock information and collects a user face image using a camera of the terminal device, releases the screen-locked state of the terminal device based on the screen unlock information, and if the user face image matches an image template stored in the terminal device, enters a first mode, or if the user face image does not match an image template stored in the terminal device, enters a second mode. Information displayed in the second mode is less than that of information displayed in the first mode.

An embodiment of the present disclosure further provides a more specific application scenario as follows. The foregoing terminal device is a mobile phone. Components of the mobile phone are described below in detail with reference to FIG. 6.

A radio frequency (RF) circuit 610 may be configured to receive and send information and receive and send a signal during a call process. Further, the RF circuit receives downlink information from a base station, then delivers the downlink information to a processor 680 for processing, and sends related uplink data to the base station. Usually, the RF circuit 610 includes, but is not limited to, an antenna, at least one amplifier, a transceiver, a coupler, a low noise amplifier (LNA), a duplexer, and the like. In addition, the RF circuit 610 may also communicate with a network and another device through wireless communication. The wireless communication may use any communication standard or protocol, which includes, but is not limited to, a GSM, General Packet Radio Service (GPRS), CDMA, WCDMA, Long Term Evolution (LTE), an email protocol, an SMS, and the like.

A memory 620 may be configured to store a software program and module. The processor 680 runs the software program and module stored in the memory 620 to perform various functional applications and data processing of the mobile phone. The memory 620 may mainly include a program storage area and a data storage area. The program storage area may store an operating system, an application program required by at least one function (such as a face matching function and an information displaying function), and the like. The data storage area may store data (such as a collected user face image and received screen unlock information) created based on use of the mobile phone, and the like. In addition, the memory 620 may include a high speed RAM, and may further include a nonvolatile memory, such as at least one magnetic disk storage device, a flash memory, or another volatile solid-state storage device.

An input unit 630 may be configured to receive input digit or character information, and generate keyboard signal input related to a user setting and function control of the mobile phone. Further, the input unit 630 may include a touch panel 631 and an input device 632. The touch panel 631, also referred to as a touchscreen, may collect a touch operation of a user on or near the touch panel 631 (such as an operation of the user on the touch panel 631 or near the touch panel 631 using any suitable object or accessory such as a finger or a stylus), and drive a corresponding connection apparatus based on a preset program. Optionally, the touch panel 631 may include two parts, a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 680. Moreover, the touch controller can receive and execute a command sent from the processor 680. In addition, the touch panel 631 may be implemented into a plurality of types such as a resistive, capacitive, infrared, or surface acoustic wave type touch panel. In addition to the touch panel 631, the input unit 630 may further include the input device 632. Further, the input device 632 may include, but is not limited to, at least one of a physical keyboard, a functional button (such as a volume control push-button or a switch push-button), a track ball, a mouse, a joystick, and the like.

A display unit 640 may be configured to display information entered by the user or information provided for the user, and various menus of the mobile phone. The display unit 640 may include a display panel 641. Optionally, the display panel 641 may be configured using a liquid crystal display (LCD), an organic light-emitting diode (OLED), or the like. Further, the touch panel 631 may cover the display panel 641. After detecting a touch operation on or near the touch panel 631, the touch panel 631 transfers the touch operation to the processor 680, to determine a type of the touch event. Then, the processor 680 provides a corresponding visual output on the display panel 641 based on the type of the touch event. Although, in FIG. 6, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. Further, the optical sensor may include an ambient light sensor and a proximity sensor. The ambient light sensor can adjust luminance of the display panel 641 based on brightness of ambient light. The proximity sensor may switch off the display panel 641 and/or backlight when the mobile phone is held to the ear. As one type of motion sensor, an accelerometer sensor may detect magnitude of accelerations in various directions (usually on three axes), may detect magnitude and a direction of gravity when the accelerometer sensor is static, and may be configured to identify an application of a mobile phone gesture (such as switchover between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

An audio frequency circuit 660, a speaker 661, and a microphone 662 may provide an audio interface between the user and the mobile phone. The audio frequency circuit 660 may convert received audio data into an electrical signal and transmit the electrical signal to the speaker 661. The speaker 661 converts the electrical signal into a sound signal for output. Then, the microphone 662 converts a collected sound signal into an electrical signal. The audio frequency circuit 660 receives the electrical signal and converts the electrical signal into audio data, and outputs the audio data to the processor 680 for processing. Then, the processor 680 sends the audio data to, for example, another mobile phone using the RF circuit 610, or outputs the audio data to the memory 620 for further processing.

Figure 6:
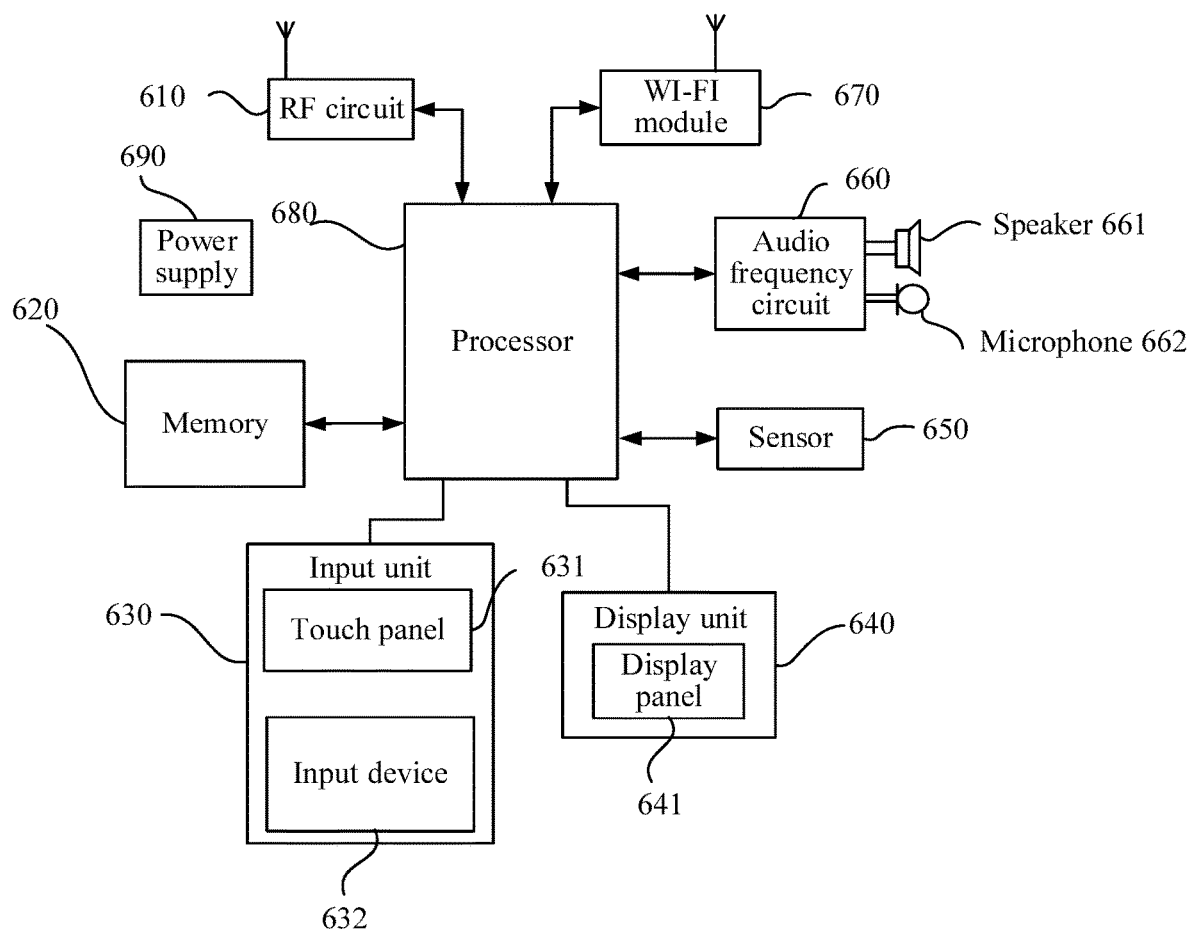
FIG. 6 is a schematic structural diagram of another terminal device according to an embodiment of the present disclosure.

WI-FI belongs to a short distance radio transmission technology. The mobile phone may help, using a WI-FI module 670, the user receive and send emails, browse a web page, access streaming media, and so on, which provides wireless broadband Internet access for the user. Although FIG. 6 shows the WI-FI module 670, it may be understood that the WI-FI module 670 is not a necessary component of the mobile phone, and when required, the WI-FI module 670 may be omitted as long as the scope of the essence of the present disclosure is not changed.

The processor 680 is a control center of the mobile phone, and is connected to various parts of the mobile phone using various interfaces and lines. By running or executing the software program and/or module stored in the memory 620, and invoking data stored in the memory 620, the processor 680 performs various functions and data processing of the mobile phone, thereby performing overall monitoring on the mobile phone. Optionally, the processor 680 may include one or more processing units. The processor 680 may integrate an application processor and a modem processor. The application processor mainly processes an operating system, a user interface, an application program, and the like. The modem processor mainly processes wireless communication. It may be understood that the foregoing modem processor may alternatively not be integrated into the processor 680.

The mobile phone further includes a power supply 690 (such as a battery) for supplying power to the components. The power supply may be logically connected to the processor 680 using a power management system, thereby implementing functions such as charging, discharging, and power consumption management using the power management system.

Although not shown, the mobile phone may further include a camera, a Bluetooth module, and the like, and details are not described herein.

In the foregoing embodiment, each step method procedure may be implemented based on the structure of the terminal device shown in FIG. 6.

An information displaying method for a terminal device in an embodiment of the present disclosure is described below with reference to FIG. 7. The method includes the following steps.

Step S701: Obtain program information.

That a terminal device obtains the program information mainly includes receiving, using a network, the program information or information triggered by the terminal device.

The terminal device described in this embodiment of the present disclosure may include a smartphone, a tablet computer, a personal digital assistant, a wearable intelligent device (for example, a smartwatch), and the like.

A screen-locked state described in this embodiment of the present disclosure is a working state in which an intelligent device runs. In one possible manner, when being in a screen-locked state, a display screen of the intelligent device is in a light-up state and can emit screen light. In a manner, luminance of the display screen of the terminal device is set to 0. In another possible manner, when being in a screen-locked state, a display screen of the intelligent device does not emit screen light. The display screen of the intelligent device may also switch, in the lock state, on or off the screen light of the display screen. For example, the display screen of the terminal device is first in a black-screen state in which the screen light is switched off. In this case, program information is obtained, and the display screen of the terminal device may switch on the screen light.

The terminal device may enter the screen-locked state by receiving an operation of a user, for example, receive signal input of a particular functional button, or receive signal input of a related operation of a user on a touchscreen. Alternatively, the terminal device may enter the screen-locked state when not receiving related instruction input within a particular time. A length of the time may be autonomously set by the user in a system. When the terminal device in this embodiment of the present disclosure is in the screen-locked state, one possible manner is that the user cannot access a program of the terminal device, and only some basic information, for example, time information, date information, communications network information, and a background picture, is displayed on the screen, another possible manner is that the user may access a preset program when the screen is locked but only can perform some particular functions, for example, functions such as pausing and switching in a music player and performing an emergency call.

The program information may be application program information (an SMS message, a multimedia message, or information of a program such as a social software program, an email program, a browser program, a music player program, or a clock program) or system program information (information such as a reminder or a task that is triggered by a system process). The terminal device may receive related information through a wireless network (a GSM network, a CDMA network, a WCDMA network, WI-FI, BLUETOOTH, and the like) or a wired network.

In an example, a manner of obtaining the program information by the terminal device may be receiving an SMS message "Have lunch in XX restaurant at 12:00 a.m.".

In an example, a manner of obtaining the program information by the terminal device may alternatively be reminder information of the terminal device. For example, the terminal device generates reminder information "Go to xx park at 7:00 at night".

Step S702: Display prompt information.

When the terminal device is in a screen-locked state, the prompt information is displayed on a screen of the terminal device.

In a possible manner, the prompt information is generated based on the program information. For example, the terminal device generates the prompt information after receiving an SMS message sent by an operator server. In a possible manner, generation of the prompt information based on the program information may be triggered by an operating system. For example, the operating system triggers a piece of prompt information based on a reminder task.

Alternatively, the prompt information in this embodiment of the present disclosure may be prompt information generated by the terminal device based on preset program information. The preset program information may include reminder information that is set on a clock program, a notepad program, or another similar application program on the terminal device, or maybe system program information (information such as a reminder or a task that is triggered by the system process). It should be particularly noted that during self-trigger of the terminal device, in an implementation, step S701 may be omitted, and a program of the terminal device directly triggers to display the prompt information.

The prompt information in this embodiment of the present disclosure may be prompt information generated by the terminal device after receiving the program information.

A displaying manner of the prompt information in this embodiment of the present disclosure may be displaying an icon on the screen of the terminal device or displaying some text on the screen of the terminal device, may be a combination of an icon and text, or may be another similar manner. In addition, when displaying the prompt information, the terminal device may also make an alert tone.

In an example, the prompt information is "You have an SMS message."

In an example, the prompt information is an icon of an application program.

Step S703: Collect a face image.

In this example, after the prompt information is displayed on the display screen, a camera of the terminal device starts to collect face image information.

In a possible manner, the operation of collecting the face image information using the camera of the terminal device may be performed after the display screen is woken up (where screen light is switched on). For example, in a case, the prompt information is displayed on the display screen of the terminal device. Because a related instruction is not received within a long time, the display screen enters a black-screen state (where the screen light is switched off). After receiving the related instruction, the terminal device wakes up the display screen. In this case, the operation of collecting the face image by the camera is triggered. The related instruction may be a signal received by a touchscreen, may be a signal received by a physical button, or may be a speech signal.

It may be understood that the operation of collecting a face image may alternatively be performed in the following manners.

In a possible manner, the operation of collecting the face image information using the camera of the terminal device may be performed after the program information is obtained.

In a possible manner, the operation of collecting the face image information using the camera of the terminal device may be performed after the prompt information is generated.

In one possible manner, the operation of collecting the face image and the operation of displaying the prompt information may be concurrently processed. In another possible manner, the operation of collecting the face image and an operation of displaying the prompt information may be sequentially processed. For example, a facial recognition program may run after the program information is obtained, to perform the operation of collecting the face image, and then the prompt information is generated based on the program information and is displayed. Alternatively, the operation of collecting the face image may be performed after the prompt information is displayed.

Step S704: Determine whether the face image is matched.

After the face image information is collected in step S703, a processor of the terminal device determines whether the face image information matches face image information pre-stored in the terminal device.

A manner of determining whether the face image information matches the pre-stored face image information in this embodiment of the present disclosure may be a manner, for example, a feature matching manner, in an existing facial recognition technology, and details are not described herein. A key point of the present disclosure is information displaying using a facial recognition result when the terminal device is still in the screen-locked state, and does not relate to improvement of the facial recognition technology.

Branches of steps S705-1, S705-2, S705-3, and S705-4 are separately performed based on different determining result for different processing.

Step S705-1: Display content information.

If the face image information matches the face image information pre-stored in the terminal device, content information corresponding to the prompt information is displayed on the screen of the terminal device.

The content information corresponding to the prompt information in this embodiment of the present disclosure may include content of the program information or a source of the program information.

In an example, the content information is "Have lunch in XX restaurant at 12:00 a.m. Sender: Li XX."

In an example, the content information is "Go to XX park at 7:00 at night."

According to the information displaying method in this embodiment of the present disclosure, related information is displayed through facial recognition without releasing the screen-locked state of a mobile phone such that convenience of information displaying is improved while information security is ensured.

Step S705-2: Display the prompt information.

If the face image information does not match the face image information pre-stored in the terminal device, content information corresponding to the prompt information is not displayed on the screen of the terminal device. In this case, displaying of the prompt information may be maintained. Alternatively, the prompt information is hidden after being displayed for a period of time, and a home screen of the intelligent device in a screen-locked state is displayed.

In an example, in this case, "You have an SMS message" is displayed on the display screen.

Step S705-3: Display content information whose keyword is deleted.

If the face image information does not match the face image information pre-stored in the terminal device, updated information corresponding to the prompt information is displayed on the screen of the terminal device. The updated information is information obtained after keyword deletion is performed on the content information corresponding to the prompt information. In a possible implementation, the user may set some keywords in the terminal device, or may set some preset keyword deletion rules. The terminal device may pre-store a keyword library for the user to choose the keyword. The keyword may be a Chinese character, an English word, a symbol, a digit, or the like.

In an example, the content information displayed on the display screen is "Have lunch in XX restaurant at 12:00 a.m."

In an example, the content information displayed on the display screen is "Go to park at night."

Step S705-4: Display content information whose keyword is replaced.

If the face image information does not match the face image information pre-stored in the terminal device, updated information corresponding to the prompt information is displayed on the screen of the terminal device. The updated information is information obtained after keyword replacement is performed on the content information corresponding to the prompt information. In a possible implementation, the user may set some keywords in the terminal device, or may set some preset keyword replacement rules. The terminal device may pre-store a keyword library for the user to choose the keyword. The keyword may be a Chinese character, an English word, a symbol, a digit, or the like.

In an example, the content information displayed on the display screen is "Have lunch in XX restaurant at 12:00 a.m. Sender: Zhang XX."

In an example, the content information displayed on the display screen is "Go to work overtime at 7:00 at night."

In an implementation of the present disclosure, the method further includes obtaining screen unlock information, where the screen unlock information includes one of the following information, voice information, fingerprint information, text information, or screen touch information, and if the screen unlock information matches preset screen unlocking information and the face image information does not match the face image information pre-stored in the terminal device, releasing the screen-locked state of the terminal device, and displaying, on the screen of the terminal device, updated information corresponding to the prompt information. The updated information is information obtained after keyword deletion or keyword replacement is performed on the content information corresponding to the prompt information. For the keyword deletion or replacement, refer to the manner in the foregoing embodiment.

In a possible implementation, the operation of collecting the face image and an operation of receiving the screen unlock information may be performed in parallel. In a possible implementation, the operation of collecting the face image may be triggered based on the screen unlock information. For example, the face image starts to be collected after the screen unlock information is received.

Figure 8:
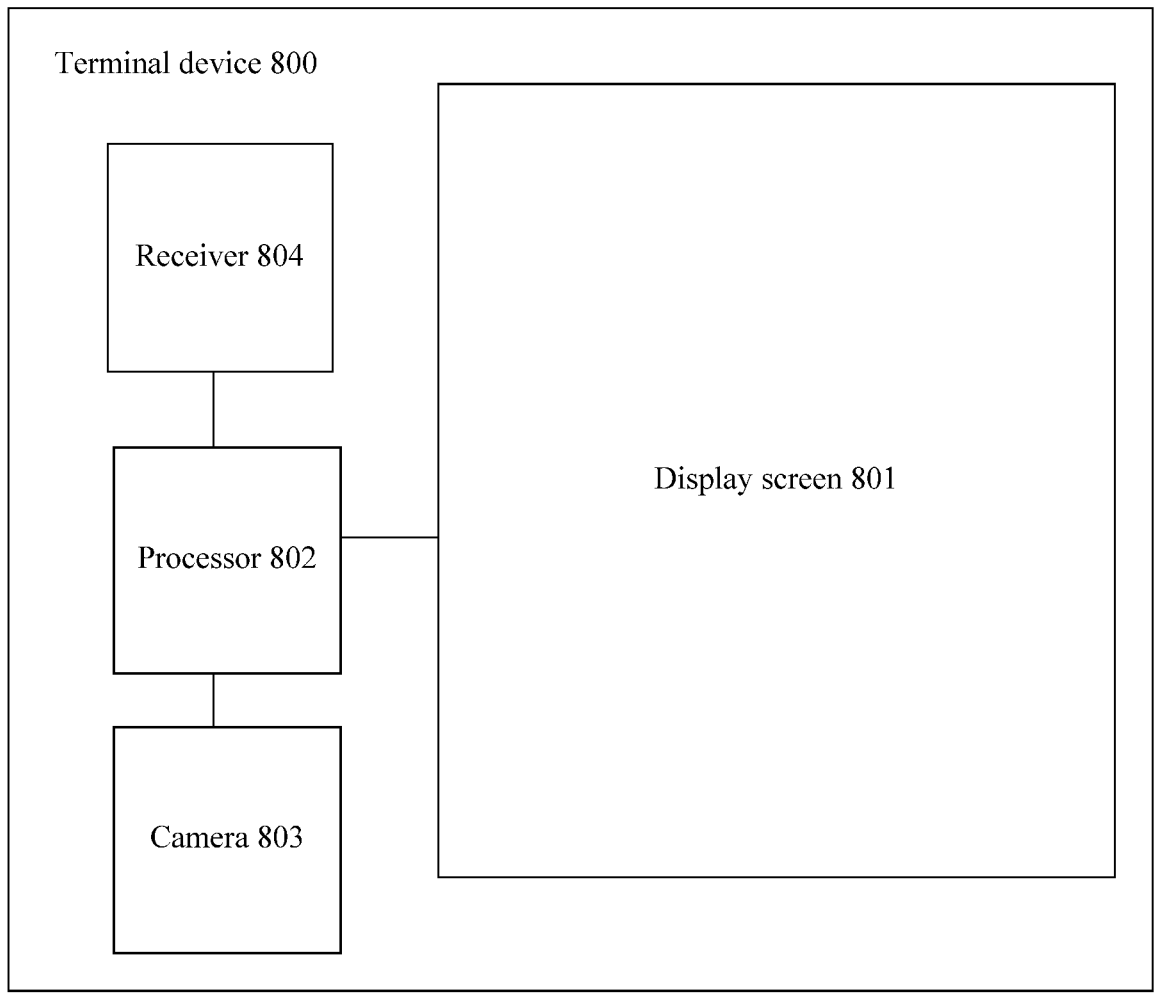
FIG. 8 is a schematic structural diagram of another terminal device according to an embodiment of the present disclosure.

A terminal device 800 in an embodiment of the present disclosure is described below with reference to FIG. 8. The terminal device 800 includes a display screen 801, a processor 802, and a camera 803.

The display screen 801 is configured to display prompt information when the terminal device 800 is in a screen-locked state.

The camera 803 is configured to collect face image information in the screen-locked state.

The processor 802 is configured to determine whether the face image information matches face image information pre-stored in the terminal device.

The display screen 801 is further configured to, when the face image information matches the face image information pre-stored in the terminal device, display content information corresponding to the prompt information.

According to the terminal device 800 in this embodiment of the present disclosure, related information is displayed through facial recognition without releasing the screen-locked state of a mobile phone such that convenience of information displaying is improved while information security is ensured.

In a possible implementation, the terminal device 800 further includes a receiver 804. The receiver 804 is configured to obtain program information. The program information includes system program information or application program information. The processor 802 is further configured to generate the prompt information based on the program information. The receiver is usually a functional component receiving information transmitted through a network, for example, a wireless network (a GSM network, a CDMA network, WI-FI, BLUETOOTH, or the like). However, in a possible implementation, for example, when the prompt information is triggered by the terminal device, the receiver may be a function module that is in the processor and that is configured to obtain local program information of the terminal device.

In a possible implementation, the display screen 801 is further configured to, when the face image information does not match the face image information pre-stored in the terminal device, display updated information corresponding to the prompt information. The updated information is information obtained after keyword deletion is performed on the content information corresponding to the prompt information.

In a possible implementation, the display screen 801 is further configured to, when the face image information does not match the face image information pre-stored in the terminal device, display updated information corresponding to the prompt information. The updated information is information obtained after keyword replacement is performed on the content information corresponding to the prompt information.

In a possible implementation, the display screen 801 is further configured to, when the face image information does not match the face image information pre-stored in the terminal device, skip displaying the content information corresponding to the prompt information.

In a possible implementation, the processor 802 is further configured to obtain screen unlock information. The screen unlock information includes one of the following information voice information, fingerprint information, text information, or screen touch information. If the screen unlock information matches preset screen unlocking information and the face image information does not match the face image information pre-stored in the terminal device, the processor 802 is further configured to release the screen-locked state of the terminal device.

The display screen 801 is further configured to display updated information corresponding to the prompt information. The updated information is information obtained after keyword deletion or keyword replacement is performed on the content information corresponding to the prompt information.

Figure 7:
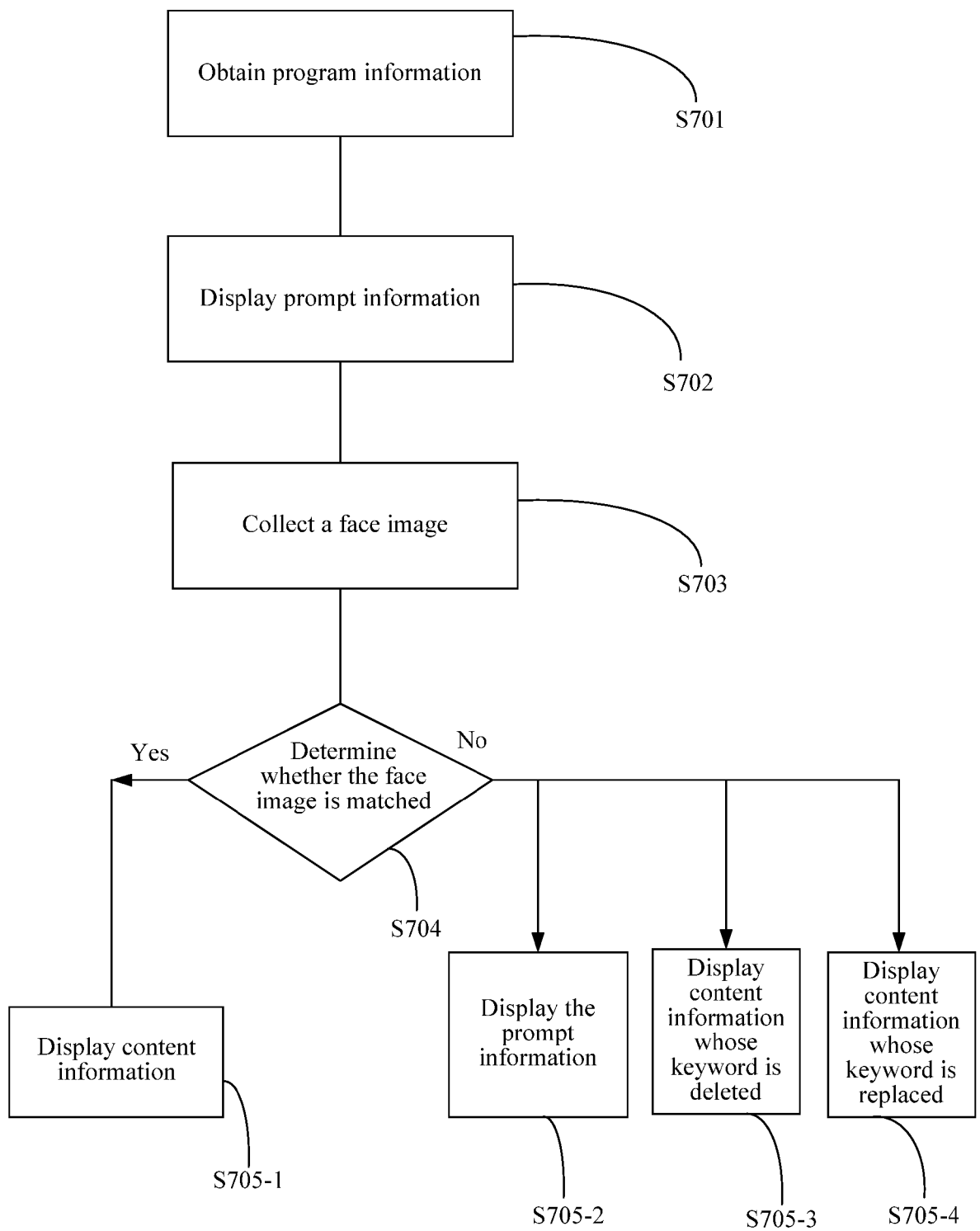
FIG. 7 is a schematic flowchart of another information displaying method for a terminal device according to an embodiment of the present disclosure.

It may be understood that for a related operation of the terminal device 800 in this embodiment, refer to the operation in the method embodiment in FIG. 7, and details are not described herein again.

An embodiment of the present disclosure further provides a computer storage medium. The computer storage medium may store a program, and when the program is executed, some or all of the steps of any method for displaying information on a terminal device that is set forth in the foregoing method embodiments are performed.

It should be noted that, to make a brief description, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to other approaches, or all or a part of the technical solutions may be implemented in the form of a software product. The software product is stored in a storage and includes several instructions for instructing a computer device (which may be a personal computer, a server, or a network device) to perform all or some of the steps of the methods described in the embodiments of the present disclosure. The foregoing storage includes any medium that can store program code, such as a universal serial bus (USB) flash drive, a ROM, a RAM, a removable hard disk, a magnetic disk, or a compact disc.

Persons of ordinary skill in the art may understand that all or some of the steps of the methods in the embodiments may be implemented by a program instructing relevant hardware. The program may be stored in a computer-readable storage. The storage may include a flash drive, a ROM, a RAM, a magnetic disk, a compact disc, and the like.

The embodiments of the present disclosure are described in detail above. The principle and implementation of the present disclosure are described herein with specific examples. The description about the embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. An information displaying method implemented by a terminal device, wherein the information displaying method comprises:
    obtaining program information;
    generating prompt information based on the program information when the terminal device is in a screen-locked state and in a black-screen state, wherein the program information comprises system program information or application program information, and wherein the prompt information is configured to inform a user of unread information;
    displaying the prompt information on a screen of the terminal device and collecting face image information from a camera of the terminal device when the screen is woken up by the program information and while the terminal device is maintained in the screen-locked state;
    when the face image information matches face image information pre-stored in the terminal device, the information displaying method further comprises:
        displaying content information corresponding to the prompt information on the screen of the terminal device;
        obtaining screen unlock information, wherein the screen unlock information comprises voice information, fingerprint information, text information, or screen touch information; and releasing the screen-locked state of the terminal device and entering a state allowing user access in response to the screen unlock information matching preset screen unlocking information;

when the face image information does not match the face image information pre-stored in the terminal device, the information displaying method further comprises skipping displaying the content information corresponding to the prompt information;

continuing collecting the face image information for matching until a fixed amount of time expires;

end collecting the face image information for matching when the fixed amount of time expires; and when a related instruction is not received and the screen enters the black-screen state, the information displaying method further comprises:

triggering the camera to collect a new face image again when the screen is woken up by the related instruction; and displaying the prompt information on the screen, wherein the new face image is configured to determine whether to display the content information corresponding to the prompt information.

2. The information displaying method of claim 1, wherein when the face image information does not match the face image information pre-stored in the terminal device, the information displaying method further comprises displaying updated information corresponding to the prompt information on the screen of the terminal device, and wherein the updated information comprises information obtained after keyword deletion is performed on the content information.

3. The information displaying method of claim 1, wherein when the face image information does not match the face image information pre-stored in the terminal device, the information displaying method further comprises displaying updated information corresponding to the prompt information on the screen of the terminal device, and wherein the updated information comprises information obtained after keyword replacement is performed on the content information.

4. The information displaying method of claim 1, further comprising:

when the face image information does not match the face image information pre-stored in the terminal device, the information displaying method further comprises obtaining screen unlock information, wherein the screen unlock information comprises voice information, fingerprint information, text information, or screen touch information; and when the screen unlock information matches the face image information pre-stored in the terminal device, the information displaying method further comprises:

releasing the screen-locked state of the terminal device; and displaying updated information corresponding to the prompt information on the screen of the terminal device, wherein the updated information comprises information obtained after keyword deletion or keyword replacement is performed on the content information.

5. The information displaying method of claim 1, further comprising:

performing keyword replacement on the content information to obtain updated information corresponding to the prompt information; and displaying the updated information when the face image information does not match the face image information pre-stored in the terminal device.

6. The information displaying method of claim 1, further comprising:

performing keyword deletion on the content information to obtain updated information corresponding to the prompt information; and displaying the updated information when the face image information does not match the face image information pre-stored in the terminal device.

7. The information displaying method of claim 1, further comprising hiding the prompt information when the prompt information has been displayed for a preset time.

8. A terminal device, comprising:

a memory configured to store instructions; and a processor coupled to the memory and configured to execute the instructions to cause the terminal device to:

obtain program information;

generate prompt information based on the program information when the terminal device is in a screen-locked state and in a black-screen state, wherein the program information comprises system program information or application program information, and wherein the prompt information is configured to inform a user of unread information;

display the prompt information on a screen of the terminal device and collect face image information from a camera of the terminal device when the screen is woken up by the program information and while the terminal device is maintained in the screen-locked state;

when the face image information matches face image information pre-stored in the terminal device, the instructions further cause the terminal device to:

display content information corresponding to the prompt information on the screen of the terminal device;

obtain screen unlock information, wherein the screen unlock information comprises voice information, fingerprint information, text information, or screen touch information; and release the screen-locked state of the terminal device and enter a state allowing user access in response to the screen unlock information matching preset screen unlocking information;

when the face image information does not match the face image information pre-stored in the terminal device, the instructions further cause the terminal device to skip displaying the content information corresponding to the prompt information;

continue collecting the face image information for matching until a fixed amount of time expires;

end collecting the face image information for matching when the fixed amount of time expires; and when a related instruction is not received and the screen enters the black-screen state, the instructions further cause the terminal device to:

trigger the camera to collect a new face image again when the screen is woken up by the related instruction; and display the prompt information on the screen, wherein the new face image is configured to determine whether to display the content information corresponding to the prompt information.

9. The terminal device of claim 8, wherein when the face image information does not match the face image information pre-stored in the terminal device, the instructions further cause the terminal device to display updated information corresponding to the prompt information, and wherein the updated information comprises information obtained after keyword deletion is performed on the content information.

10. The terminal device of claim 8, wherein when the face image information does not match the face image information pre-stored in the terminal device, the instructions further cause the terminal device to display updated information corresponding to the prompt information, wherein the updated information comprises information obtained after keyword replacement is performed on the content information.

11. The terminal device of claim 8, wherein the instructions further cause the terminal device to:
  obtain screen unlock information, wherein the screen unlock information comprises voice information, fingerprint information, text information, or screen touch information; and
  when the screen unlock information matches preset screen unlocking information and the face image information does not match the face image information pre-stored in the terminal device, the instructions further cause the terminal device to:
    release the screen-locked state of the terminal device; and
    display updated information corresponding to the prompt information, wherein the updated information comprises information obtained after keyword deletion or keyword replacement is performed on the content information.

12. The terminal device of claim 8, wherein the instructions further cause the terminal device to:
  perform keyword replacement on the content information to obtain updated information corresponding to the prompt information; and
  display the updated information when the face image information does not match the face image information pre-stored in the terminal device.

13. The terminal device of claim 8, wherein the instructions further cause the terminal device to:
  perform keyword deletion on the content information to obtain updated information corresponding to the prompt information; and
  display the updated information when the face image information does not match the face image information pre-stored in the terminal device.

14. The terminal device of claim 8, wherein the instructions further cause the terminal device to hide the prompt information when the prompt information has been displayed for a preset time.

15. A computer program product comprising computer-executable instructions stored on a non-transitory computer-readable medium that, when executed by a processor, cause a terminal device to:
  obtain program information;
  generate prompt information based on the program information when the terminal device is in a screen-locked state and in a black-screen state, wherein the program information comprises system program information or application program information, and wherein the prompt information is configured to inform a user of unread information;
  display the prompt information on a screen of the terminal device and collect face image information from a camera of the terminal device when the screen is woken up by the program information and while the terminal device is maintained in the screen-locked state;
  when the face image information matches face image information pre-stored in the terminal device, the instructions further cause the terminal device to:
    display content information corresponding to the prompt information on the screen of the terminal device;
    obtain screen unlock information, wherein the screen unlock information comprises voice information, fingerprint information, text information, or screen touch information; and
    release the screen-locked state of the terminal device and enter a state allowing user access in response to the screen unlock information matching preset screen unlocking information;
  when the face image information does not match the face image information pre-stored in the terminal device, the instructions further cause the terminal device to:
    skip displaying the content information corresponding to the prompt information;
  continue collecting the face image information for matching until a fixed amount of time expires;
  end collecting the face image information for matching when the fixed amount of time expires; and
  when a related instruction is not received and the screen enters the black-screen state, the instructions further cause the terminal device to:
    trigger the camera to collect a new face image again when the screen is woken up by the related instruction; and
    display the prompt information on the screen, wherein the new face image is configured to determine whether to display the content information corresponding to the prompt information.

16. The computer program product of claim 15, wherein when the face image information does not match the face image information pre-stored in the terminal device, the instructions further cause the terminal device to display updated information corresponding to the prompt information on the screen of the terminal device, and wherein the updated information comprises information obtained after keyword deletion is performed on the content information.

17. The computer program product of claim 15, wherein when the face image information does not match the face image information pre-stored in the terminal device, the instructions further cause the terminal device to display updated information corresponding to the prompt information on the screen of the terminal device, and wherein the updated information comprises information obtained after keyword replacement is performed on the content information.

18. The computer program product of claim 15, wherein the instructions further cause the terminal device to:
  when the face image information does not match the face image information pre-stored in the terminal device, obtain screen unlock information, wherein the screen unlock information comprises voice information, fingerprint information, text information, or screen touch information; and
  when the screen unlock information matches the face image information pre-stored in the terminal device, the information displaying method further comprises:
    release the screen-locked state of the terminal device; and
    display updated information corresponding to the prompt information on the screen of the terminal device, wherein the updated information comprises information obtained after keyword deletion or keyword replacement is performed on the content information.

19. The computer program product of claim 15, wherein the instructions further cause the terminal device to:
   perform keyword replacement on the content information to obtain updated information corresponding to the prompt information; and
   display the updated information when the face image information does not match the face image information pre-stored in the terminal device.

20. The computer program product of claim 15, wherein the instructions further cause the terminal device to:
   perform keyword deletion on the content information to obtain updated information corresponding to the prompt information; and
   display the updated information when the face image information does not match the face image information pre-stored in the terminal device.

\* \* \* \* \*